W. R. LAMB.
SNAP COTTON CRUSHER AND SEPARATOR.
APPLICATION FILED SEPT. 26, 1907.

917,318.

Patented Apr. 6, 1909.
2 SHEETS—SHEET 1.

Inventor
Wm. R. Lamb

Witnesses

By
Attorneys

W. R. LAMB.
SNAP COTTON CRUSHER AND SEPARATOR.
APPLICATION FILED SEPT. 26, 1907.
917,318.
Patented Apr. 6, 1909.
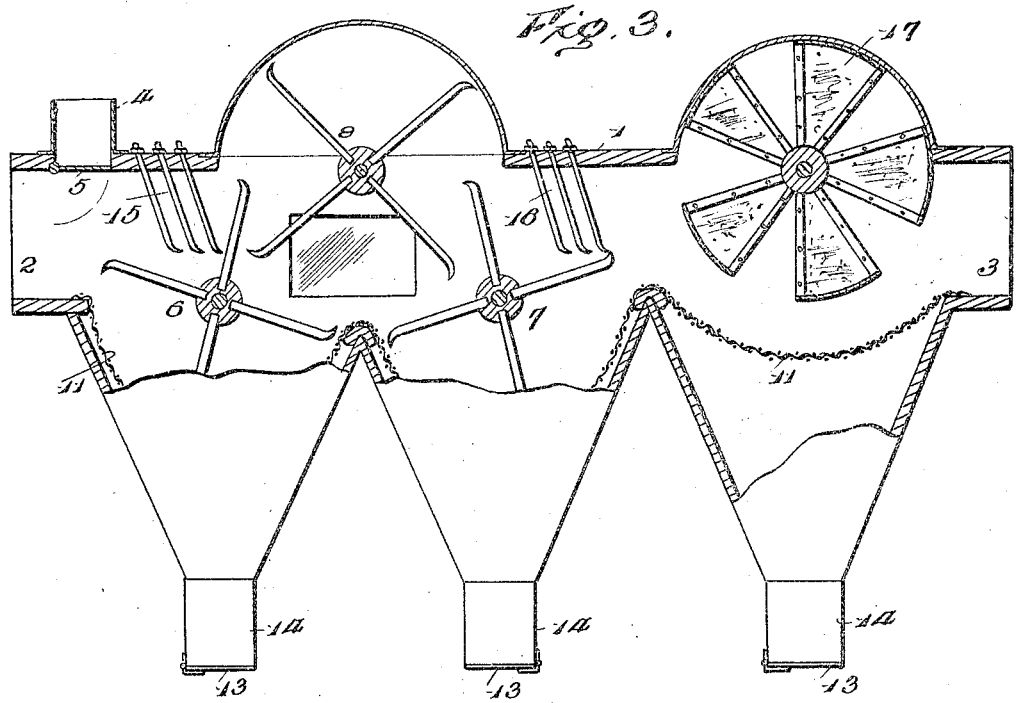
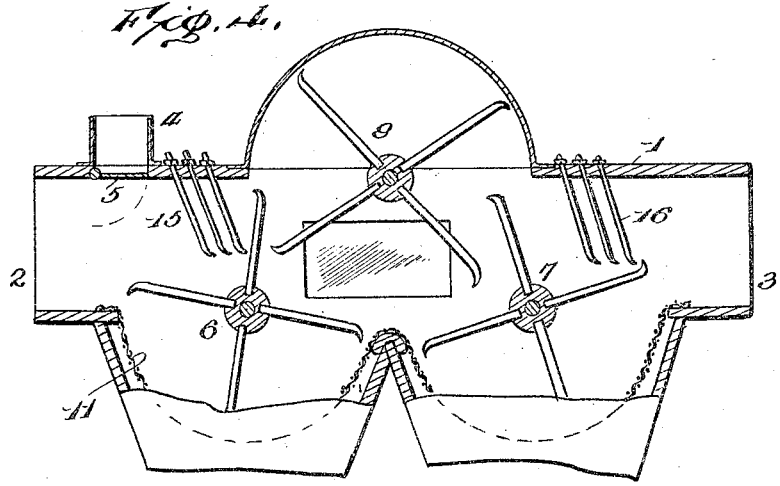

UNITED STATES PATENT OFFICE.

WILLIAM R. LAMB, OF BOWIE, TEXAS.

SNAP COTTON CRUSHER AND SEPARATOR.

No. 917,318.     Specification of Letters Patent.     Patented April 6, 1909.

Application filed September 26, 1907. Serial No. 394,692.

*To all whom it may concern:*

Be it known that I, WILLIAM R. LAMB, citizen of the United States, residing at Bowie, in the county of Montague and State of Texas, have invented certain new and useful Improvements in Snap Cotton Crushers and Separators, of which the following is a specification.

This invention appertains to apparatus or machinery designed most especially for use in connection with elevating and distributing systems of cotton gins for crushing the bolls of cotton, separating the hulls, dirt, trash and other foreign matter from the cotton and purifying the latter at it passes from the wagon or seed cotton storage house to the receivers and feeders of the various cotton gins.

The invention is adapted either for pneumatic elevating and distributing systems, or those which involve the use of the suction conduit or tube for taking the cotton from the wagon or seed cotton storage house and conveying the same to the feeders of the cotton gins, the crushing, separating and purifying devices being arranged in the path of the cotton between the wagons or seed cotton storage house and the elevator receivers over the cotton gins so as to facilitate the crushing of the bolls of the snap cotton and the removal of the cotton therefrom and the purifying of the cotton from dirt, trash and other foreign matter before it reaches the feeders of the gins, thereby decreasing wear upon the gin saws and other operating parts of the machinery and conducing to increasing the life or period of service thereof.

The invention is also applicable to mechanical distributers utilizing a belt and may be advantageously employed in all sections where cotton is raised to clean and purify the same and insure a high grade product of lint and adding materially to its value and stability.
The invention is especially adapted for northern and western sections, where the cotton is late in maturing and is frosted before the bolls open to admit of the cotton being picked as the bolls can be snapped or pulled from the plants and crushed, separated and purified and ginned into a marketable product commanding a good price.

Figure 1:
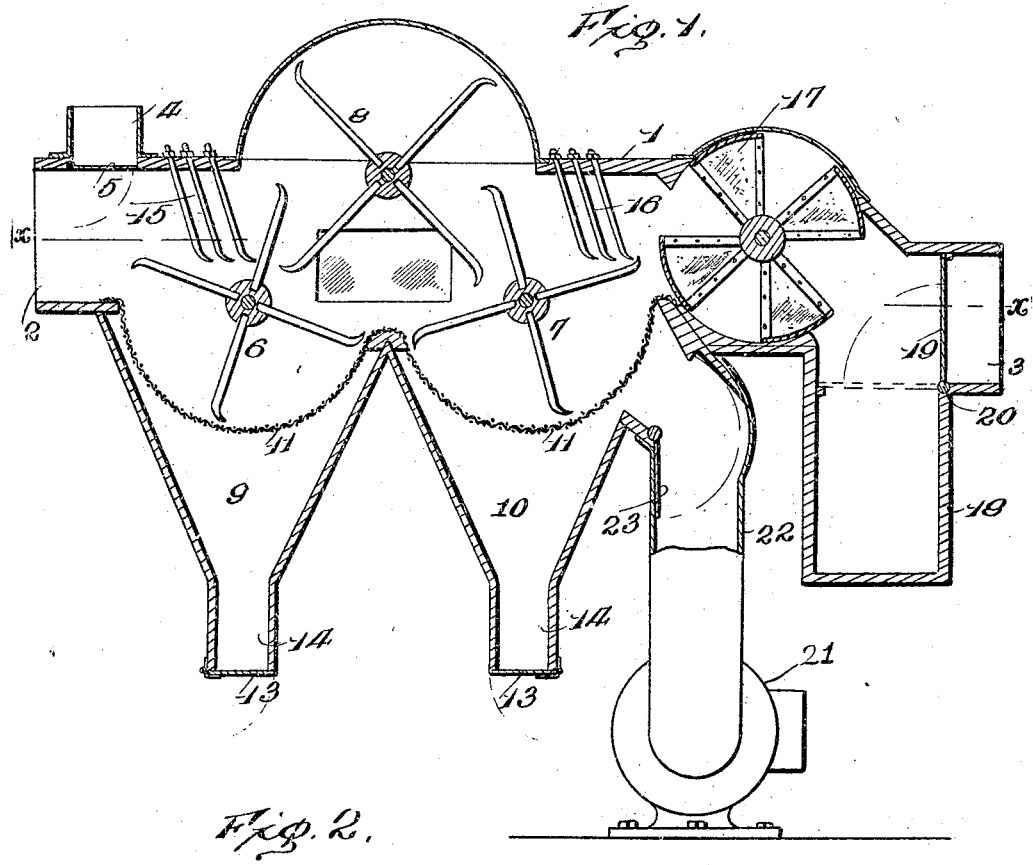
Figure 2:
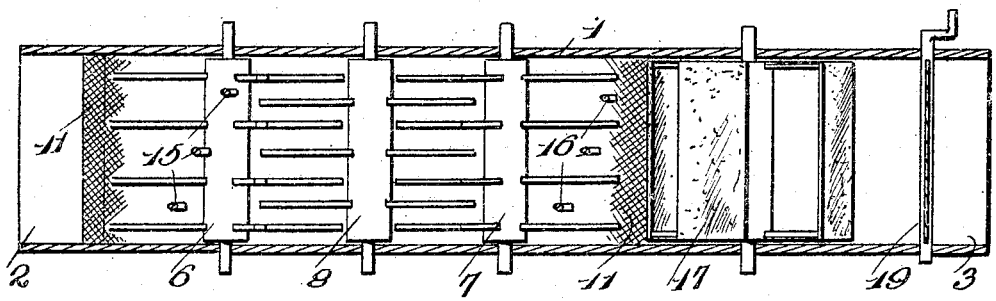

For a full understanding of the invention and the merits thereof and also to acquire a knowledge of the details of construction and the means for effecting the result, reference is to be had to the following description and accompanying drawings, in which:

Figure 1 is a vertical central longitudinal section of a cotton crusher, separator and purifier embodying the invention. Fig. 2 is a horizontal section thereof on the line $x$—$x$ of Fig. 1. Fig. 3 is a view similar to Fig. 1 of a modification. Fig. 4 is a view similar to Fig. 3 of a further modification.

Corresponding and like parts are referred to in the following description and indicated in all the views of the drawings by the same reference characters.

The operating parts of the apparatus or machine are housed within a casing 1 through which air is circulated either by suction or blast. The length and size of the casing will depend upon the capacity of the machine and the number of gins to be supplied thereby. The casing 1 has an inlet 2 at one end and an outlet 3 at the opposite end. The inlet 2 is adapted to be connected with a pipe or other form of conductor leading from either the wagon to be unloaded or the cotton storage house from which the material is drawn to be crushed, separated and purified before being supplied to the gins. The outlet 3 may be connected in any manner with the feeder by means of which the purified cotton is distributed or supplied to the various gins. The overflow from the feeder or distributer of any make or type is returned to the receiving end of the machine and enters the casing at 4, said opening being controlled by means of a valve 5 which is closed when the supply is not in excess of the amount of material fed to the gins, but which valve is opened when the supply is greater than the amount distributed by the feeder so that the excess or overflow may be returned to the machine to be again supplied thereby to the gin distributer.

The crushing mechanism consists of three rotary beaters 6, 7 and 8 arranged in a group, and there may be as many groups as desired and according to the size and capacity of the machine, it being understood that the groups act successively upon the material passed between the elements thereof to insure a thorough crushing of the bolls and a loosening of the hulls from the cotton. The rotary beaters 6 and 7 are located at one side of the passage or space inclosed by the casing 1 and the rotary beater 8 is arranged upon the opposite side of said passage or space with its teeth arranged to operate in the spaces formed between the teeth of the rotary beaters 6 and 7. The rotary beater 8 is located directly opposite the space formed between the rotary beaters 6 and 7 and its teeth approach close to the shafts of said beaters 6 and 7. The teeth of the several beaters extending across the passage or space of the casing 1 move in the same direction so as to urge or positively move the cotton through the machine. The beaters 6 and 7 rotate in a clock-wise direction whereas the beater 8 rotates in an anti-clock-wise direction. The extremities of the teeth of the several beaters curve in a relatively rearward direction so as to shed or clear the cotton more readily. A trap 9 is located beneath the rotary beater 6 and a similar trap 10 is arranged beneath the rotary beater 7. The traps 9 and 10 taper in form and are adapted to catch dirt, trash, broken hulls and the like disengaged from the cotton in the process of crushing. Curves 11 of wire screening or reticulated material are located at the upper ends of the traps 9 and 10 and catch and retain cotton while providing for escape of dirt, trash and like foreign matter. The lower end of each of the traps 9 and 10 is contracted and provided with a valve 13 hinged at one edge and free to swing at the opposite edge. These valves are normally held in a closed position by any suitable means, such as the suction within the casing, but may be readily opened at any time to remove the accumulations of dirt from the traps.

Concave teeth 15 and 16 project into the space of the casing 1 at a slight inclination from the top of the machine and coöperate with the teeth of the respective beaters 6 and 7 to effect crushing of the cotton passing through the machine. The lower extremities of the teeth 15 and 16 are curved forward to admit of the cotton being readily dragged therefrom by the coöperating teeth of the beaters. The teeth 15 and 16 are arranged to operate in the spaces formed between the teeth of the respective beaters 6 and 7, and said teeth may be provided in any number of rows. The teeth 15 and 16 are secured to the upper side of the casing in any substantial way and arrest the forward movement of the cotton until forcibly moved between them by the action of the teeth of the beaters. The cotton is initially crushed between the teeth of the beater 6 and the teeth 15 and is acted upon a second time by the teeth of the beaters 6 and 8 and a third time by being forced between the teeth of the beaters 8 and 7 and finally by the coöperation of the teeth of the beater 7 and the teeth 16. The several and successive crushing actions to which the cotton is subjected, breaks up the hulls and loosens dirt and foreign matter, which is separated by the meshes or openings of the curves 11. It is to be understood that the casing may be of any length according to the number of groups of beaters or crushing elements.

In the construction shown in Figs. 1 and 3, a rotary valve 17 is located near the discharge end of the machine and consists of a shaft and a series of wings or blades radiating therefrom, said wings or blades being covered upon one side with rubber or like material to insure a close fit with the inner walls of the chamber. The purpose of the rotary valve is to insure positive feed of the cotton to the gin distributing mechanism, particularly when the same is of the belt distributer type.

In the construction shown in Fig. 4, the rotary valve 17 and its chamber are dispensed with, the pneumatic distributer of the gins having direct connection with the casing to receive the material immediately from the last beater 7 to the crusher. Fig. 1 also shows the casing provided with a pendent coupling end 18, which forms a spout to direct the cotton to a belt distributer. A valve 19 pivoted at 20 is adapted to be turned either to shut off delivery from the outlet 3 or the spout 18. This construction admits of the invention being applied to either a pneumatic distributer or a belt distributer. When a belt distributer is employed for supplying the cotton to the several gins, the valve 19 is turned to cut off the cotton from the outlet 3 and to direct the same through the spout 18. A suction fan 21 is connected by means of a conveyer 22 to the casing near its delivery end and at a point between the rotary valve 17 and the rearmost crusher 7—16. A valve 23 is adapted to close the upper end of the conveyer 22 when the machine is used in connection with a pneumatic gin distributer. When the machine is connected to a belt distributer, the valve 23 is opened so that the suction fan 21 may draw off foreign matter and at the same time create a suction through the casing to effect delivery of the cotton to the spout 18, whence it passes to said belt distributer.

In order that the interior of the machine may be observed, protected openings 25 are provided in opposite sides of the casing and are located at the most advantageous points to admit of unobstructed observation of the workings of the machine.

Having thus described the invention, what is claimed as new is:

1. In a machine of the character set forth, the combination of a casing through which the cotton is designed to pass, two sets of fixed teeth projecting within the casing upon one side of the path of the cotton, a pair of rotary beaters journaled within the casing upon the opposite side of the path of the cotton, each of the rotary beaters being provided with teeth coöperating with one of the sets of fixed teeth, a third rotary beater arranged between the pair of rotary beaters and upon the opposite side of the path of the cotton to the same, the said third rotary beater being formed with teeth coöperating with the teeth of the pair of beaters, a trap arranged under each of the rotary beaters of the pair, and a curved reticulated partition located at the mouth of each of the traps and extending partially around the respective rotary beater.

2. In a machine of the character set forth, the combination of a casing through which the cotton is designed to pass, the said casing being provided with an outlet and an inlet, two sets of fixed teeth projecting within the casing upon one side of the path of the cotton, a pair of rotary beaters journaled within the casing upon the opposite side of the path of the cotton and formed with teeth coöperating with the fixed teeth, a third rotary beater journaled within the casing upon the opposite side of the path of the cotton to the before mentioned pair of rotary beaters and coöperating with each of the same, a rotary valve at the outlet, and a suction fan connected to the casing between the rotary valve and the adjacent rotary beater.

3. In a machine of the character set forth, the combination of a casing through which the cotton is designed to pass, the said casing being formed with an inlet and an outlet, two sets of fixed teeth projecting within the casing upon one side of the path of the cotton, a rotary beater arranged between the fixed teeth and upon the same side of the path of the cotton, a pair of rotary beaters journaled within the casing upon the opposite side of the path of the cotton for coöperation with the fixed teeth and the first mentioned rotary beater, a trap for each rotary beater of the pair, a curved partition of reticulated material arranged at the upper end of each of the traps and extending partially around the corresponding rotary beater, a rotary valve at the outlet, and a suction fan connected to the casing between the rotary valve and the adjacent rotary beater.

In testimony whereof I affix my signature in presence of two witnesses.

WILLIAM R. LAMB. [L. S.]

Witnesses:
 MARGARET MORGAN,
 ELIZABETH M. G. LAMB.